Jan. 1, 1957  J. LOVE  2,775,806
ADJUSTABLE GIRTH CLAMPING RING
Filed Oct. 20, 1953  3 Sheets-Sheet 1

Inventor
JOHN LOVE
By Lucke Lucke
Attorney

Jan. 1, 1957 J. LOVE 2,775,806
ADJUSTABLE GIRTH CLAMPING RING
Filed Oct. 20, 1953 3 Sheets-Sheet 2
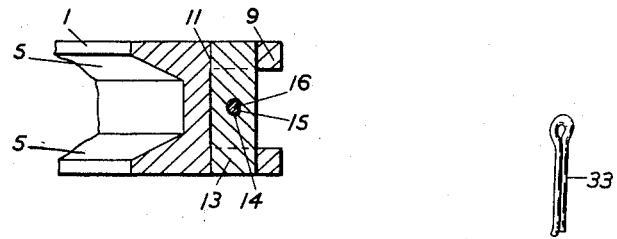
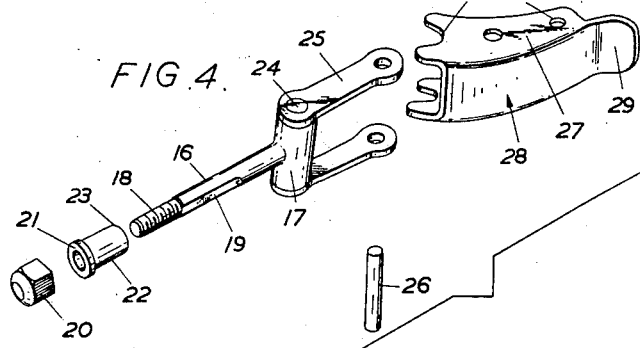
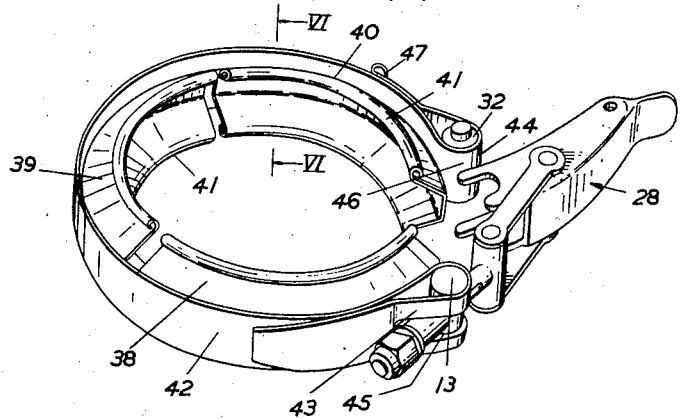
Inventor
JOHN LOVE
By *Lucke & Lucke*
Attorney Jan. 1, 1957   J. LOVE   2,775,806
ADJUSTABLE GIRTH CLAMPING RING
Filed Oct. 20, 1953   3 Sheets-Sheet 3
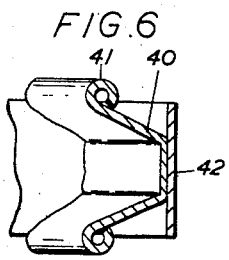
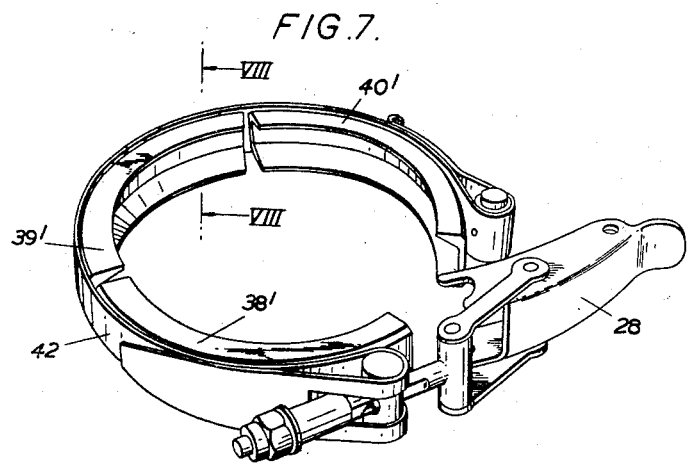
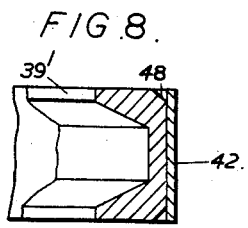
Inventor
JOHN LOVE

United States Patent Office 2,775,806
Patented Jan. 1, 1957

2,775,806

ADJUSTABLE GIRTH CLAMPING RING

John Love, Langside, Glasgow, Scotland, assignor to K. A. C. Limited, Glasgow, Scotland, a British company Application October 20, 1953, Serial No. 387,235

Claims priority, application Great Britain September 9, 1953

1 Claim. (Cl. 24—271)

This invention concerns improvements in or relating to couplings for connecting together in co-axial alignment two externally peripherally flanged members at least one of such members usually, although not necessarily, being of a tubular or hollow form, e. g. a pipe, hose or the like. Such members, whether tubular or hollow or not, and said couplings will hereinafter be referred to, for convenience, respectively as "pipes," and "pipe couplings."

The invention is concerned with the type of pipe coupling in which the ends of the pipes to be connected are furnished with peripheral flanges extending outwardly from the pipes, and in which these flanges are to be pulled together in the direction of the axis of the pipes at their junction by means of an articulated clamping ring of the kind composed of, a plurality of inter-connected or articulated arcuate sections or segments of channel shaped cross-section arranged end-to-end to form the ring and fitted around the said flanges, the latter, and/or if desired, the inside surfaces of the end walls of the clamping ring, being inclined to the plane of the ring so that, as the latter is tightened around the pipes, axial pressure is applied to the flanges on the latter to draw them together, and wherein a toggle lever system is provided between the end sections of the clamping ring as a readily operated fastening means for contracting the clamping ring around the pipes.

The object of this invention is to provide an improved form of clamping ring of the kind specified and more particularly to provide an improved form of quickly closed and released fastening means for the clamping ring.

According to this invention there is provided an articulated clamping ring of the kind comprising a plurality of interconnected arcuate sections of channel shaped cross-section arranged end-to-end and means for fastening together the end sections of such ring, characterised in that the said fastening means comprise a swivel block carried by the end portion of one of the end sections of the ring and arranged with its axis of rotation parallel to the axis of the clamping ring; a T-bolt having a shank passing through said swivel block perpendicularly to the axis thereof and adjustable in the direction of its shank in the latter whilst being non-rotatable therein; a spacing sleeve mounted upon and freely adjustable along the shank of said T-bolt at a portion thereof on the opposite side of said swivel block to the head of the said T-bolt; nut means on the end portion of the shank of the T-bolt and more remote from said swivel block than said sleeve, said nut means being positioned to bear against the outer end of said sleeve whilst the other end of the said sleeve is positioned to bear against said swivel block; a link system pivoted at one end to the head of said T-bolt so as to be pivotal about the axis of said head; a toggle lever pivoted intermediate its ends to the other end of said link system; a finger-piece formed by one end of the toggle lever for the operation of the same; and a portion at the other end of the said toggle lever positioned for engagement with the end portion of the second end section of the clamping ring, whereby on effecting this engagement and moving the toggle lever into an over-dead-centre position alongside the adjacent ring section, the two end sections of the clamping ring are drawn together to contract the clamping ring and lock it in the contracted position.

According to a further feature of the invention the said swivel block is furnished with a diametrical non-circular hole through which passes the shank of the said T-bolt, such shank being of a cross-sectional shape corresponding to the non-circular form of said hole, so that the said bolt shank is axially adjustable in said swivel block but is non-rotatable therein.

Preferably the said diametrical hole through the swivel block is a broached hole of approximately cylindrical form with a flat wall portion and the shank of said bolt is a close but free sliding fit in such hole.

Preferably the toggle lever is forked at the end remote from said finger piece to embrace the end section of the clamping ring opposite to that by which the swivel block is carried, and each arm of said forked end of the toggle lever is notched to receive a lateral projection on said second end section of the clamping ring, there being one such projection on each side of such clamping ring section and serving as anchorages and fulcrums for engagement with the forked end of the toggle lever during the movement of the same towards its clamping and locked position.

According to a further feature of the invention, the said anchorage and fulcrum projections are formed by coaxial reduced end portions of an anchorage block fixed in the corresponding end section of the clamping ring.

Desirably said link system comprises a pair of parallel links pivoted at one end to the opposite ends of the head of said T-bolt and at the other end to opposite sides of the said toggle lever.

It will be appreciated that by arranging the fastening means for the clamping ring as above described the clamping effect which can be obtained with the ring can be adjusted by tightening the said nut along the shank of the T-bolt thereby to bring the head of the latter nearer or farther away from the swivel block as desired. Preferably the said nut is a self locking nut and may include a fibre bush or any other suitable means for preventing it rotating under vibration and like extraneous influences.

It will also be appreciated that this adjustment can be effected whilst maintaining the pivoting axis of the toggle lever and the axis of pivoting of its links upon the head of the T-bolt both parallel with the axis of pivoting of the swivel block.

In saying that the separate sections or segments of the clamping ring are articulated together it is intended to mean that these are either directly pivoted to one another, as by adjacent ends of adjacent sections respectively having a lug and bifurcations connected by a transverse pivot pin, or a case wherein all the sections are secured to a surrounding spring ring along which the sections are arranged in spaced end-to-end relationship, the ring being adapted to spring open as soon as the fastening of the clamping ring is released. Such spring ring may be secured to the channel shaped sections of the ring in any suitable manner but preferably is spot-welded thereto. Furthermore this ring preferably extends at least the full width of the said sections. The said sections may be of cast or pressed metal or of other suitable form.

When the sections of the ring are connected by a spring strap as above described, the said swivel block and the anchorage block respectively may be retained in turned over or looped ends of this strap; otherwise the said anchorage and swivel blocks may be mounted in transverse holes provided in lugs on the outer surfaces of the end sections of the clamping ring, the lug carrying the swivel block being centrally bifurcated in the plane of the ring to permit oscillation of the shank of the T-bolt about the axis of the swivel block.

In order that the invention may be more readily understood certain embodiments of the same will now be described by way of example with reference to the accompanying drawings in which:

Figure 3 is an enlarged fragmentary section on line III—III of Figure 2;

Figure 4 is an exploded perspective view of the fastening means of the clamping ring shown in Figures 1 to 3;

Figure 5 is a perspective view, similar to Figure 1, of a modified form of clamping ring constructed in accordance with this invention;

Figure 6 is an enlarged section on line VI—VI of Figure 5;

Figure 7 is a perspective view similar to Figures 1 and 5 but showing a still further modified form of clamping ring constructed in accordance with this invention; and Figure 8 is an enlarged section on line VIII—VIII of Figure 7.

Figure 1:
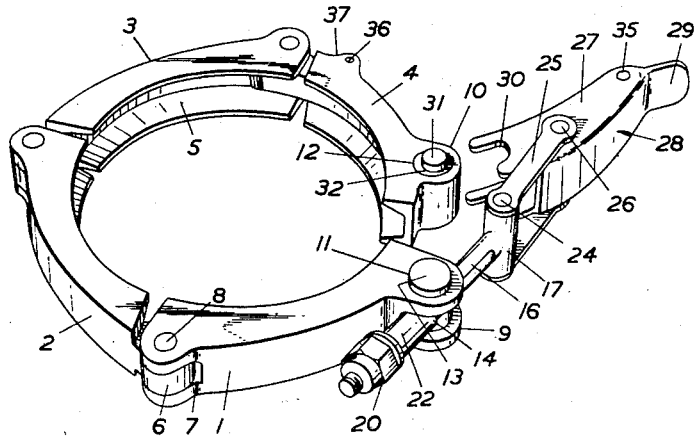
Figure 1 is a perspective view of one form of clamping ring constructed in accordance with this invention and shown with its fastening in the released condition.
Figure 2:
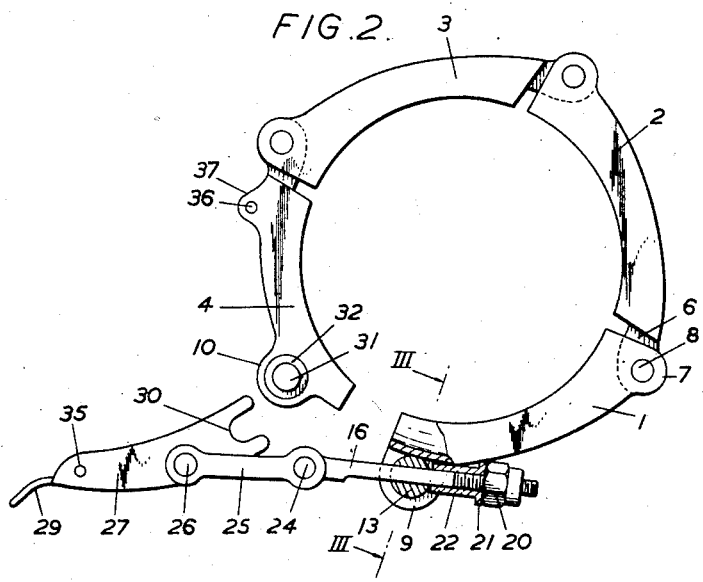
Figure 2 is an underneath plan of the ring shown in Figure 1.

Referring to the embodiment of the invention illustrated in Figures 1 to 4 of the drawings, it will be seen that the clamping ring illustrated comprises four sections 1, 2, 3 and 4, of arcuate form and channel shaped cross-section. The inner faces 5 of the flanges forming the channel diverge outwardly towards the free edges of the side walls of the sections, these sections being of approximately the same length.

One end of each of the sections 2, 3 and 4 is provided with a central lug 6 which engages between a bifurcated end 7 of the adjoining section, i. e. sections 1, 2 and 3, a transverse pivot pin 8 being provided and passing through such bifurcated end 7 and lug 6 whereby the sections are articulated together. Thus all the sections of the ring are capable of swinging in the plane of the ring, but are not capable of any substantial movement transverse to such plane. The ends of the sections of the ring are substantially radial to the ring, when the latter is closed, but are slightly spaced apart so as to permit free closing of the ring without binding between adjacent section ends. The free end of section 1 of the ring is provided with an outwardly extending or radial bifurcated lug 9 and an outwardly extending or radial lug 10 is provided adjacent the free end of the ring section 4. Each of the lugs 9 and 10 of the two end sections 1 and 4 is furnished with a cylindrical bore extending therethrough from side to side of the clamping ring, these bores being marked respectively 11 and 12.

A swivel block 13 is mounted in the bore 11 of the ring section 1, such swivel block being of cylindrical form and projecting at both ends slightly beyond the outer faces of the lug 9. A hole 14 extends diametrically through the block 13 centrally of its length, such hole being of non-circular cross-sectional form and preferably being of mainly cylindrical form but having a flat side 15 as shown in Figure 3. Conveniently this hole is formed by a broaching operation.

The shank 16 of a T-shaped bolt is located in the hole 14 and the transverse head 17 of this bolt is in the form of a short sleeve of a length approximately equal to the maximum width, measured axially of the ring, of the lug 10.

The shank 16 of the said T-shaped bolt is, as is clearly seen from Figure 4, furnished at its free end with a screw-threaded part 18 which may, if desired, be of a slightly smaller diameter than the unthreaded part of the shank. The shank 16 is also furnished with a longitudinally extending flat 19, whereby the cross-sectional form of that part of the shank which will at any time be located in the hole 14 through the swivel block 13, is of non-circular form and corresponds in cross-sectional form to the cross-sectional shape of such hole. Thus the shank 16 cannot rotate in the swivel block 13 but is free to move axially in the latter. A nut 20, conveniently of the self-locking type is provided on the screw-threaded end of the shank 16 of the T-bolt for adjusting this shank 16 axially with respect to the swivel block 11 and thereby to adjust the effect of the fastening means of the clamping ring as will hereinafter be apparent. This nut 20 is adapted to bear upon the outwardly flanged end 21 of a cylindrical sleeve 22 freely mounted on the shank 16 so as to be capable of axial movement therealong, the inner end 23 of this sleeve being adapted to pass between the side cheeks of the bifurcated lug 9 of the ring section 1 and to engage directly against the adjacent part of the swivel block 13 which may be flattened around the corresponding end of the hole 14 therethrough so as to serve as a seating for the said inner end 23 of the sleeve 22.

A pivot pin 24 is mounted in the tubular head 17 of the T-bolt, the opposite ends of this pivot pin carrying the corresponding ends of a pair of links 25. The other ends of the links 25 are joined by a transverse pivot pin 26 parallel to the pivot pin 24 and passing freely through the side cheeks 27 of a toggle lever 28 of channel shaped cross-section and conveniently formed of pressed metal, the pivot pin 26 passing through this toggle lever intermediate the ends thereof.

One end of the toggle lever 28 is furnished with a finger piece 29 by which the lever may be operated and swung about the pivot pin 26, whilst each of the side cheeks 27 at the other end of the toggle lever is furnished with a U-shaped notch 30 adapted closely to receive one of the reduced cylindrical ends 31 of a hard metal anchorage block 32 fixed, e. g. by being a drive fit, into the bore 12 of the lug 10 of the ring section 4.

Initially, as is usual with toggle lever fasteners, the distance between the axis of the swivel block 13 and the axis of the pivot pin 26 carrying the toggle lever is adjusted, by adjusting the nut 20, so as to be slightly greater than the distance between the axis of the swivel block 13 and the axis of the anchorage block 32 when the clamping ring is fully tightened around the pipes to be clamped thereby. Thus, when the clamping ring is open and is being fitted around the flanges of a pair of pipes to fasten them together, it is necessary first of all to engage the notches 30 of the toggle lever 28 about the anchorage projections 31 with the toggle lever 28 in a position transverse to the shank 16 of the T-bolt and then to move the end 29 of the toggle lever inwardly towards the ring section 4 and finally on to the latter, this resulting in the toggle lever swinging about the anchorage projections 31 and drawing the two adjacent ends of the ring sections 1 and 4 together thereby tightly to clamp the clamping ring about the pipe flanges on which it is fitted. In the final and locked position of the toggle lever, the pivot pin 26 is in an over-dead-centre position with respect to the anchorage projections 31 whereby tension in the shank 16 of the T-bolt will not release the clamping ring. A split pin 33 (see Figure 4) may be passed through opposite holes 35 in the side cheeks 27 of the toggle lever 28 and through a transverse hole 36 in a lug 37 on the end section 4 of the clamping ring to secure the toggle lever in its locked position against accidental release, the toggle lever 28 in its fully locked position embracing the ring section 4 between its side cheeks 27.

It will be appreciated that, with an arrangement as above described, it is a very simple matter to preset the clamping ring to close to any predetermined extent within the limits of the ring itself, simply by adjusting the nut 20 on the shank 16 of the T-bolt, and thereby moving this shank through the swivel block 11, the shank being incapable of rotating as the nut 20 is turned thereon.

Figures 5 and 6 illustrate a modification of the arrangement shown in Figures 1 to 4, this modification being only in the form of the clamping ring sections and the method of connecting them together, and therefore all like parts retain the same references. However, as may be seen, the clamping ring comprises only three sections, marked 38, 39 and 40 respectively, these sections each being of outwardly divergent channel shaped cross-sectional form, being formed from pressed metal, and are each furnished with outwardly beaded edges 41. These sections are secured in spaced end-to-end relationship by a spring metal connector strap 42 which is preferably spot welded to the outer peripheral portions of the sections 38, 39 and 40 or secured thereto in any other suitable fashion. The strap 42 is preferably as wide, or almost as wide, as the maximum axial width of the sections 38, 39 and 40 themselves.

The two ends of the strap 42 are doubled upon themselves as is clearly shown in the drawing to form loops 43 and 44 respectively, the loop 43 being transversely slotted at 45 as shown. The swivel block 13 is mounted in the loop 45 and the anchorage block 32 is mounted in the loop 44 and secured therein by a transverse pin 46. The swivel block 13 carries the shank 16 of the T-bolt and the parts associated therewith, all as previously described. To provide for the reception of the locking pin 33 the end extremity of the portion of the strap 42 which is doubled over to form the loop 44 is bent into the form of a hollow cylinder of small diameter as is clearly shown at 47.

In the modification shown in Figures 7 and 8, the arrangement is almost identical with that illustrated in Figure 5 except that the sections 38', 39' and 40' of the ring are of a slightly different cross-sectional form to those shown in Figure 5. This alternative cross-sectional form is clearly indicated in Figure 8 and, as will be seen, the inside surfaces of the channel shaped sections converge between the free edges of the end flanges of the sections whilst the outer peripheral corners of the sections are chamfered off at 48. It will also be seen that the spring strap 42 extends the full width of the sections 38', 39' and 40'.

I claim:

A quick acting coupling device adapted to connect together the adjoining ends of two conduits comprising: an articulated clamping ring having end sections, fastening means connected to said end sections for adjustably contracting said clamping ring, said fastening means and said clamping ring being disposed in a single plane perpendicular to the axis of said clamping ring, said fastening means including a swivel block carried for pivotal movement by one of said end sections, said swivel block being disposed with its axis of pivoting parallel to the axis of said clamping ring, an anchorage block carried by the other of said end sections, said anchorage block being disposed with its longitudinal axis parallel to the axis of said clamping ring, said swivel block being provided with a broached bore of substantially cylindrical form including a flat wall portion, the axis of said bore being substantially perpendicular to the axis of said clamping ring, a T-bolt having a head portion and a shank portion threaded at the end thereof, said shank portion being shaped for movement in the lengthwise direction only through said bore in said swivel block, a spacing sleeve freely mounted on said shank portion at the end thereof and capable of axial movement therealong, a nut threaded on the threaded end of said shank portion, said spacing sleeve bearing between said swivel block and said nut when the latter is threaded on said shank, a toggle lever, link means pivotally connected at one end thereof to the ends of said head portion of said T-bolt for movement about an axis parallel to the axis of said clamping ring and pivotally connected at the other end thereof intermediate the extremities of said toggle lever and along an axis substantially parallel to the axis of said clamping ring, one of the extremities of said toggle lever being provided with notched means engageable with said anchorage block, the distance between the axis of said swivel block and the axis of pivotal connection of said link means intermediate the extremities of said toggle lever being slightly greater than the distance between the axes of said swivel block and of said anchorage block whereby when said clamping ring is contracted said toggle lever is self locking, the contraction of said clamping ring being adjustable by threading said nut on the threaded end of said shank portion, said one extremity of said toggle lever being forked for embracing the adjacent section of said clamping ring, said notched means being provided on each arm of said forked extremity, and said anchorage block further comprising coaxial anchorage projections engageable by said notched means during movement of said toggle lever towards its position for contracting said clamping ring.

References Cited in the file of this patent

UNITED STATES PATENTS

| 627,987 | Dick | July 4, 1899 |
| 1,978,241 | Wilcox | Oct. 23, 1934 |
| 2,426,423 | Woolsey | Aug. 26, 1947 |
| 2,411,113 | Kinzl | May 4, 1948 |
| 2,693,372 | Ludwig | Nov. 2, 1954 |

FOREIGN PATENTS

| 7,180 | France | Mar. 27, 1907 |
| | of 363,083 | |
| 603,707 | Great Britain | June 22, 1948 |
| 663,646 | Great Britain | Dec. 27, 1951 |